3,533,868
Patented Oct. 13, 1970

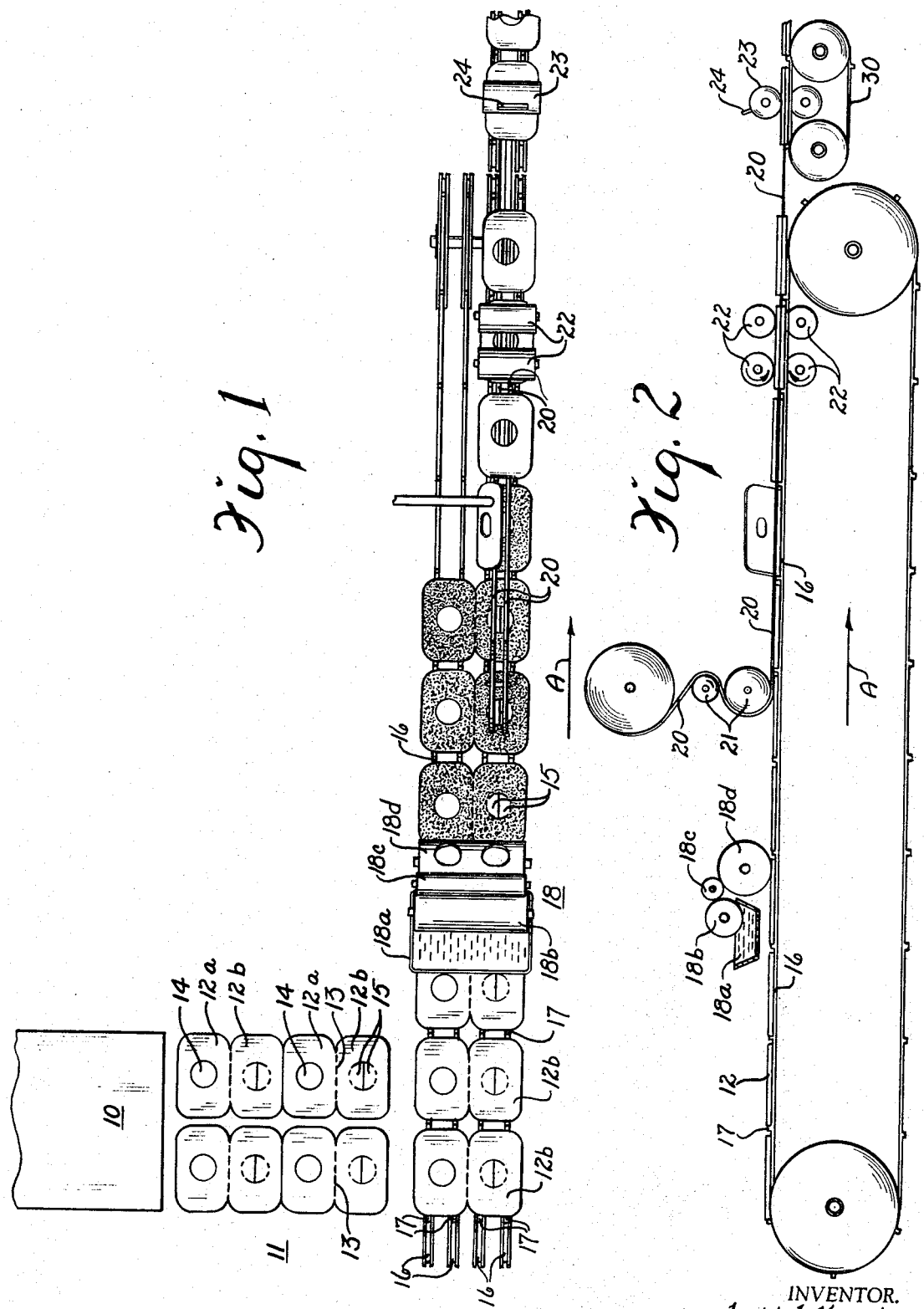

3,533,868
METHOD OF MANUFACTURING END CLOSURES FOR A VACUUM CLEANER DUST BAG
John J. Kowalewski, Riverside, Conn., assignor, by mesne assignments, to Consolidated Foods Corporation, Chicago, Ill., a corporation of Maryland
Filed Feb. 15, 1967, Ser. No. 616,388
Int. Cl. B65h 81/00
U.S. Cl. 156—161                        6 Claims

ABSTRACT OF THE DISCLOSURE

A method of applying continuous strip of elastic material to an end closure disc moving at a uniform determined velocity, folding the end closure disc to clamp the strips therebetween while supplying the strip to the discs at a speed which is less than the speed of the disc in order to pretension the strip and after the end closure discs are adhered together the strips are severed.

BACKGROUND OF THE INVENTION

Methods and apparatus for the manufacture of disposable dust bag and closures are known from U.S. Pats. 2,895,551 and 3,052,588. The known apparatus and methods could be utilized in the manufacture of an end cover having a pair of flaps which are urged to closed position by an elastic band overlying each of the flaps. However, the known methods and apparatus does not contemplate pretensioning the rubber bands for optimum operation of the flaps.

SUMMARY OF THE INVENTION

This invention relates to a method of making an end cover having a pair of flaps pivotally connected thereto for closing the opening in the end cover and more particularly to a method of incorporating an elastic band in the end cover which is pretensioned.

A primary object of the invention therefore is to provide a method of applying an elastic band while held under tension to an end cover for a vacuum cleaner dust bag.

Another object of the invention is to provide an improved method of manufacturing end covers for vacuum cleaner dust bags.

The foregoing objects and other objects, features and advantages derived from the invention will become apparent from the following detailed description taken in connection with the attached drawing.

BRIEF DESCRIPTION OF THE DRAWING

FIG. 1 is a schematic plan view representation of apparatus for carrying out the method of manufacturing end covers according to the invention.

FIG. 2 is a schematic side elevation of the apparatus shown in FIG. 1.

DETAILED DESCRIPTION

Referring to the drawing reference numeral 10 designates a sheet of cardboard or chipboard being fed into a die cutting machine divides the sheet 10 into a plurality of discs 12 comprising half portions 12a and 12b connected together by a score or fold line 13. Each disc half 12a has an aperture 14 which may be circular, as shown, square, rectangular or of any desired shape. Each disc half 12b is die cut in station 11 to form a pair of flaps 15 which are movably hinged to the disc half 12b by a score line (not shown). The size, shape and location of the flaps 15 and aperture 14 are selected so that the flaps can open into the aperture when the disc halves 12a and 12b are folded about the line 13 and glued together in the usual manner as described hereinafter. The separate disc pairs 12 are transferred from the die cutting station 11 onto a continuously moving conveyor such as spaced parallel endless chains 16 which are driven in the direction indicated by the arrow A. Each of the four chains 16 is provided with a series of spaced pickers or pusher lugs 17. Opposite pairs of pusher lugs 17 position each disc pair 12 spaced from an adjacent disc pair as they move from left to right in FIGS. 1 and 2. A coating of a suitable adhesive is applied to each disc pair 12 as it passes through a coating station 18. The coating station includes a glue pot 18a, a pick-up roller 18b, a transfer roller 18c and an applicator or printing roller 18d which applies a pattern of adhesive onto a disc pair 12 but the flaps 15 are free of adhesive. Adhesive may be applied to either one or both pairs of disc halves 12a, 12b. Following the application of an adhesive coating to each disc pair 12 a continuous elastic band or pair of bands 20 are layed in the adhesive and positioned to overlay the flaps 15, that is, each band 20 overlies one flap 15 of a series of discs 12 and extends from the feed rollers 21 to the first two pairs of idle pressure rollers 22. The drawing shows a pair of discrete bands but it is also contemplated to supply a single strip of elastic material. The band feed rollers 21 are driven at a slower velocity than the velocity of the chain so that the elastic strip or bands 20 are each slightly stretched over the distance between the rollers 21 and 22. Between the last mentioned rollers the disc halves 12a and 12b are folded upon one another to sandwich the rubber bands therebetween. Any known arrangement may be utilized for folding the disc halves as shown in the drawing.

When a continuous single strip of elastic material is used it may be layed over the aperture 14 in disc half 12a and before the disc halves are folded closed the elastic strip is slit in known manner so that the single strip becomes, in effect, a pair of elastic bands, one for each flap. Alternatively the strip may be slit by a rotary cutter which cuts the strip 20 as it passes over the upper roller 21 (FIG. 2). The folded disc halves are pressed against one another by the pressured rollers 22 and the rubber bands (or strip) are therefore locked between the discs 12a, 12b. Following the pressure rollers 22 is a pair of separately driven rollers 23 and a second conveyor 30 driven at the same speed as roller 23. The roller 23 and conveyor chains 30 are driven at a slightly greater speed than the chains 16 so that the elastic bands are stretched between the adjacent folded discs, one of which is held between pressure rollers 22 and the other disc is held between the chains 30 and rollers 23. A lancing knife 24 is carried by the upper roller 23 whereby the stretched bands are severed by the knife 24 which just grazes the surface of the lower support roller 23.

The foregoing description and drawing is given by way of illustrating the invention and variations will be apparent to those skilled in the art. Therefore it is not intended that the appended claims be limited in scope by the foregoing.

What is claimed is:

1. A method of manufacturing an end closure for a vacuum cleaner dust bag comprising die cutting a pair of foldably connected end closure discs from a sheet of stock material, one of said discs of said pair having an aperture and the other of said discs of said pair having hinged flaps registerable with said aperture, conveying a plurality of said disc pairs over a path in tandem relation, applying an adhesive material to at least one surface of one of said disc pairs on each of said plurality of disc pairs in said path of movement for adhering said disc pairs together when folded, but leaving the surfaces of said flaps free of adhesive, applying an elongated continuous means of elastomeric material to the surface of one of said discs of said pair on each of said plurality of disc pairs so that said elastic means overlies said flaps when the disc pairs are in juxtaposition after folding, folding the leading pair of said discs one upon the other for adhering said discs together and sandwiching said elastic means therebetween, pressing the folded discs together to form an integral end closure and locking said elastic means therebetween, feeding said elastic means onto said discs in said path at a rate which is less than the rate of movement of said discs in said path for stretching said elastic means, and severing the elastic means between adjacent pairs of folded and pressed discs.

2. The method according to claim 1 wherein said adjacent folded and pressed discs are moved apart to stretch said elastic means and then said elastic means is severed.

3. The method according to claim 2 wherein said adhesive is applied to said juxtaposed surface of the disc having said flaps and said elastic means is layed on said adhesive.

4. The method according to claim 3 wherein said adhesive is applied to said juxtaposed surface of each of said discs while leaving the surface of said flaps free of adhesive.

5. The method according to claim 1 wherein said elastic means comprise a pair of elastic bands.

6. The method according to claim 1 wherein said elastic means comprises a strip of elastomeric material with the additional step of slitting said strip before folding said discs one upon the other.

References Cited

UNITED STATES PATENTS

| | | | |
|---|---|---|---|
| 1,370,597 | 3/1921 | Lambert | 156—161 XR |
| 1,412,310 | 4/1922 | Lambert | 156—161 XR |
| 2,895,551 | 7/1959 | Anderson et al. | 156—514 |
| 3,052,588 | 9/1962 | Anderson et al. | 156—514 XR |

CARL D. QUARFORTH, Primary Examiner

S. HELLMAN, Assistant Examiner

U.S. Cl. X.R.

156—166, 252; 53—14